US010350859B2

(12) United States Patent
Arndt et al.

(10) Patent No.: US 10,350,859 B2
(45) Date of Patent: Jul. 16, 2019

(54) COMPOSITE GLASS HAVING REDUCED THICKNESS FOR A HEAD-UP DISPLAY (HUD)

(71) Applicant: SAINT-GOBAIN GLASS FRANCE, Courbevoie (FR)

(72) Inventors: Martin Arndt, Aachen (DE); Stephan Kremers, Heinsberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/531,718

(22) PCT Filed: Oct. 13, 2015

(86) PCT No.: PCT/EP2015/073625
§ 371 (c)(1),
(2) Date: May 30, 2017

(87) PCT Pub. No.: WO2016/091435
PCT Pub. Date: Jun. 16, 2016

(65) Prior Publication Data
US 2017/0313032 A1 Nov. 2, 2017

(30) Foreign Application Priority Data

Dec. 8, 2014 (EP) .................................... 14196732

(51) Int. Cl.
B32B 17/10 (2006.01)
B60J 1/20 (2006.01)

(52) U.S. Cl.
CPC .... B32B 17/10036 (2013.01); B32B 17/1077 (2013.01); B32B 17/10137 (2013.01);
(Continued)

(58) Field of Classification Search
CPC ........ B32B 17/10036; B32B 17/10541; B32B 17/10788; B32B 17/10761;
(Continued)

(56) References Cited

U.S. PATENT DOCUMENTS 5,013,134 A 5/1991 Smith
5,130,174 A 7/1992 Esposito
(Continued)

FOREIGN PATENT DOCUMENTS

DE 102007059323 A1 6/2009
DE 102008008758 A1 8/2009
(Continued)

OTHER PUBLICATIONS

Written Opinion with English translation for International Application No. PCT/EP2015/073625 filed on Oct. 13, 2015 in the name of Saint-Gobain Glass France, dated Dec. 9, 2015. 11 pgs.
(Continued)

Primary Examiner — David Sample
Assistant Examiner — Donald M Flores, Jr.
(74) Attorney, Agent, or Firm — Pillsbury Winthrop Shaw Pittman LLP

(57) ABSTRACT

A composite glass for a head-up display is described. The composite glass has an outer pane made of glass and an inner pane made of glass, which are bonded to one another via a thermoplastic intermediate layer. The inner pane has a thickness less than 1.2 mm, and the thickness of the intermediate layer in the vertical course between a lower edge and an upper edge of the composite glass is variable at least in sections with a maximum wedge angle less than or equal to 0.3 mrad.

27 Claims, 2 Drawing Sheets

Figure 1:
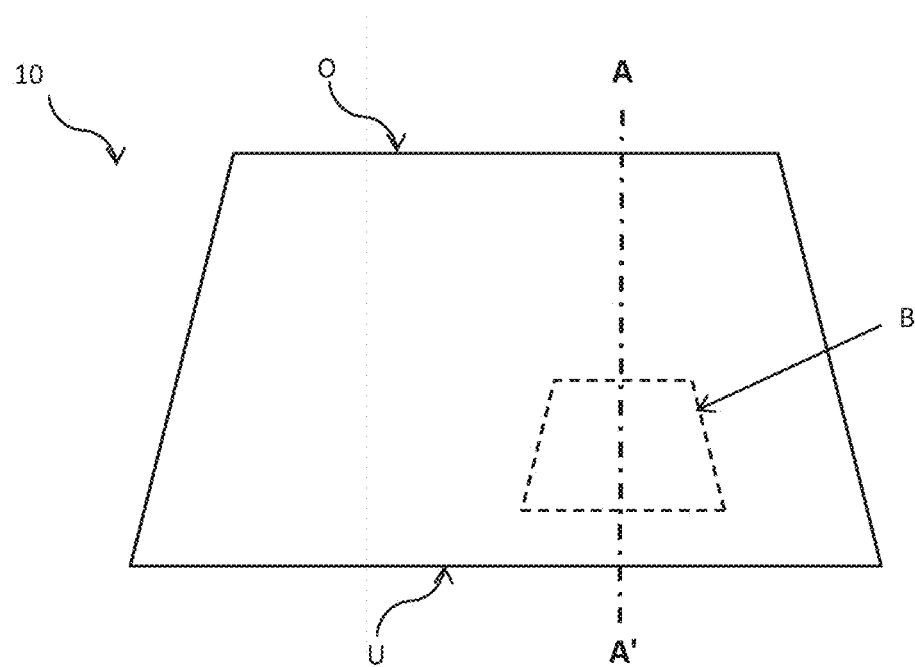

(52) U.S. Cl.
CPC .. *B32B 17/10541* (2013.01); *B32B 17/10568* (2013.01); *B32B 17/10761* (2013.01); *B32B 17/10788* (2013.01); *B60J 1/20* (2013.01); *B32B 2605/00* (2013.01)

(58) Field of Classification Search
CPC ........ B32B 17/10568; B32B 17/10137; B32B 17/1077; B32B 2605/00; B60J 1/20
See application file for complete search history.

(56) References Cited

U.S. PATENT DOCUMENTS

| | | | |
|---|---|---|---|
| 5,504,622 A | 4/1996 | Oikawa et al. | |
| 5,675,944 A | 10/1997 | Kerr et al. | |
| 5,812,332 A | 9/1998 | Freeman | |
| 5,945,199 A | 8/1999 | Morin et al. | |
| 8,075,983 B2 * | 12/2011 | Masaki | B32B 17/10036 428/195.1 |
| 8,764,923 B2 | 7/2014 | Durbin et al. | |
| 9,067,386 B2 | 6/2015 | Miyai | |
| 9,260,906 B2 | 2/2016 | Schreiber | |
| 9,915,822 B2 | 3/2018 | Arndt et al. | |
| 10,234,681 B2 | 3/2019 | Arndt et al. | |
| 2002/0086141 A1 | 7/2002 | Sauer | |
| 2004/0109251 A1 | 6/2004 | Freeman et al. | |
| 2004/0166288 A1 | 8/2004 | Travis et al. | |
| 2005/0142332 A1 | 6/2005 | Sauer | |
| 2006/0210776 A1 | 9/2006 | Lu et al. | |
| 2007/0009714 A1 | 1/2007 | Lee et al. | |
| 2007/0020465 A1 | 1/2007 | Thiel et al. | |
| 2007/0082219 A1 | 4/2007 | Fleury et al. | |
| 2007/0148472 A1 * | 6/2007 | Masaki | B32B 17/10036 428/426 |
| 2008/0176043 A1 | 7/2008 | Masaki et al. | |
| 2009/0294212 A1 | 12/2009 | Miyai | |
| 2010/0314900 A1 | 12/2010 | Labrot et al. | |
| 2011/0189426 A1 | 8/2011 | Durbin et al. | |
| 2012/0025559 A1 | 2/2012 | Offermann et al. | |
| 2012/0094084 A1 * | 4/2012 | Fisher | B32B 17/10036 428/174 |
| 2013/0188260 A1 | 7/2013 | Matsushita et al. | |
| 2013/0249942 A1 | 9/2013 | Green et al. | |
| 2013/0316158 A1 | 11/2013 | Rehfeld et al. | |
| 2014/0011000 A1 | 1/2014 | Dunkmann et al. | |
| 2014/0319116 A1 | 10/2014 | Fischer et al. | |
| 2014/0354692 A1 | 12/2014 | Ng-Thow-Hing et al. | |
| 2014/0362434 A1 | 12/2014 | Schmitz et al. | |
| 2014/0375816 A1 | 12/2014 | Maihoefer | |
| 2016/0291324 A1 | 10/2016 | Arndt et al. | |
| 2017/0003503 A1 | 1/2017 | Arndt et al. | |
| 2017/0313032 A1 | 11/2017 | Arndt et al. | |
| 2018/0149865 A1 | 5/2018 | Arndt et al. | |
| 2018/0149867 A1 | 5/2018 | Kremers et al. | |
| 2018/0157033 A1 | 6/2018 | Arndt et al. | |

FOREIGN PATENT DOCUMENTS

| | | | |
|---|---|---|---|
| DE | 102013012648 A1 | 3/2014 | |
| DE | 102014001710 A1 | 8/2014 | |
| DE | 102014005977 A1 | 9/2014 | |
| EP | 0430889 A2 | 6/1991 | |
| EP | 0597727 A2 | 5/1994 | |
| EP | 0852280 A1 | 7/1998 | |
| EP | 1800855 A1 | 12/2006 | |
| EP | 1800855 A1 * | 6/2007 | ....... B32B 17/10036 |
| EP | 1880243 A2 | 1/2008 | |
| EP | 1800855 B1 | 2/2013 | |
| FR | 2680584 A1 | 2/1993 | |
| JP | H03209210 A | 9/1991 | |
| JP | H11247540 A | 9/1999 | |
| JP | 2004536009 A | 12/2004 | |
| JP | 2007277052 A | 10/2007 | |
| JP | 2008201667 A | 9/2008 | |
| JP | 2009035444 A | 2/2009 | |
| JP | 2011207645 A | 10/2011 | |
| JP | 2013001613 A | 1/2013 | |
| JP | 2017502124 A | 1/2017 | |
| KR | 0135743 B1 | 4/1998 | |
| KR | 20100094987 A | 8/2010 | |
| WO | 03/024155 A2 | 3/2003 | |
| WO | 2006/122305 A2 | 11/2006 | |
| WO | 2009071135 A1 | 6/2009 | |
| WO | 2010/121986 A1 | 10/2010 | |
| WO | 2012/029916 A1 | 3/2012 | |
| WO | 2012/073030 A1 | 6/2012 | |
| WO | 2013/104438 A1 | 7/2013 | |
| WO | 2013/104439 A1 | 7/2013 | |
| WO | 2013/104507 A1 | 7/2013 | |
| WO | 2013/136374 A1 | 9/2013 | |
| WO | 2014/079567 A1 | 5/2014 | |
| WO | 2015/086233 A1 | 6/2015 | |
| WO | 2015/086234 A1 | 6/2015 | |
| WO | 2015/134836 A1 | 9/2015 | |
| WO | 2016/091435 A1 | 6/2016 | |
| WO | 2016/198678 A1 | 12/2016 | |
| WO | 2016/198679 A1 | 12/2016 | |
| WO | 2017/157660 A1 | 9/2017 | |

OTHER PUBLICATIONS

Aclocque, J.P., "Double Vision as a Disturbing Optical Failure of the Windshield", Z. Glastechn. Ber., vol. 43, Issue 5, pp. 193-198, 16 pages, (May 1970), (English translation + German original).

International Search Report issued for International Patent Application No. PCT/EP2014/074115, filed Nov. 10, 2014 on behalf of Saint-Gobain Glass France, dated Jan. 21, 2015. 4 pages (English Translation + German Original).

International Search Report issued for International Patent Application No. PCT/EP2014/074116, filed Nov. 10, 2014 on behalf of Saint-Gobain Glass France, dated Jan. 21, 2015. 5 pages (English Translation + German Original).

International Search Report issued for International Patent Application No. PCT/EP2016/063406, filed Jun. 10, 2016 on behalf of Saint-Gobain Glass France, dated Sep. 21, 2016. 7 pages (English Translation + German Original).

International Search Report issued for International Patent Application No. PCT/EP2016/063407, filed Jun. 10, 2016 on behalf of Saint-Gobain Glass France, dated Sep. 21, 2016. 7 pages (English Translation + German Original).

International Search Report issued for International Patent Application No. PCT/EP2017/054735, filed Mar. 1, 2017 on behalf of Saint-Gobain Glass France, dated May 24, 2017. 9 pages (English Translation + German Original).

International Preliminary Report on Patentability issued for International Patent Application No. PCT/EP2014/074116, filed Nov. 10, 2014 on behalf of Saint-Gobain Glass France, dated Jun. 14, 2016. 19 pages (English Translation + German Original).

International Preliminary Report on Patentability issued for International Patent Application No. PCT/EP2014/074115, filed Nov. 10, 2014 on behalf of Saint-Gobain Glass France, dated Jun. 14, 2016. 16 pages (English Translation + German Original).

International Preliminary Report on Patentability issued for International Patent Application No. PCT/EP2016/063406, filed Jun. 10, 2016 on behalf of Saint-Gobain Glass France, dated Dec. 12, 2017. 15 pages (English Translation + German Original).

International Preliminary Report on Patentability issued for International Patent Application No. PCT/EP2016/063407, filed Jun. 10, 2016 on behalf of Saint-Gobain Glass France, dated Dec. 12, 2017. 15 pages (English Translation + German Original).

Non-Final Office Action issued for U.S. Appl. No. 15/038,321, filed May 20, 2016 on behalf of Saint-Gobain Glass France, dated May 9, 2017. 13 pages.

Non-Final Office Action issued for U.S. Appl. No. 15/881,576, filed Jan. 26, 2018 on behalf of Saint-Gobain Glass France, dated Mar. 28, 2018. 6 pages.

Non-Final Office Action issued for U.S. Appl. No. 15/039,794, filed May 26, 2016 on behalf of Saint-Gobain Glass France, dated Feb. 22, 2018. 31 pages.

(56) References Cited

OTHER PUBLICATIONS

Notice of Allowance issued for U.S. Appl. No. 15/038,321, filed May 20, 2016 on behalf of Saint-Gobain Glass France, dated Aug. 28, 2017. 9 pages.
Notice of Allowance issued for U.S. Appl. No. 15/038,321, filed May 20, 2016 on behalf of Saint-Gobain Glass France, dated Nov. 9, 2017. 8 pages.
Written Opinion issued for International Patent Application No. PCT/EP2014/074115, filed Nov. 10, 2014 on behalf of Saint-Gobain Glass France, dated Jan. 21, 2015. 14 pages (English Translation + German Original).
Written Opinion issued for International Patent Application No. PCT/EP2014/074116, filed Nov. 10, 2014 on behalf of Saint-Gobain Glass France, dated Jan. 21, 2015. 17 pages (English Translation + German Original).
Written Opinion issued for International Patent Application No. PCT/EP2016/063406, filed Jun. 10, 2016 on behalf of Saint-Gobain Glass France, dated Sep. 21, 2016. 13 pages (English Translation + German Original).
Written Opinion issued for International Patent Application No. PCT/EP2016/063407, filed Jun. 10, 2016 on behalf of Saint-Gobain Glass France, dated Sep. 21, 2016. 7 pages (English Translation + German Original).
International Search Report for International Application No. PCT/EP2015/073625 filed on Oct. 13, 2015 in the name of Saint-Gobain Glass France, dated Dec. 9, 2015. 6 pgs.
Notice of Allowance for U.S. Appl. No. 15/531,718, filed Jan. 26, 2018 on behalf of Saint-Gobain Glass France, dated Sep. 12, 2018. 7 pages.
Final Office Action for U.S. Appl. No. 15/039,794, filed May 26. 2016, on behalf of Saint-Gobain Glass France. dated Dec. 12. 2018. 31 pages.
International Preliminary Report on Patentability for International Application No. PCT/EP2015/073625 filed on Oct. 13, 2015 on behalf of Saint-Gobain Glass France dated Jun. 13, 2017 6 pages (English Translation).
International Preliminary Report on Patentability for International Application No. PCT/EP2017/054735 filed Mar. 1, 2017 on behalf of Saint-Gobain Glass France. dated Sep. 18, 2018. 14 pages. (English Translation + German Original).
Notice of Allowance for U.S. Appl. No. 15/881,576, filed Jan. 26, 2018 on behalf of Saint-Gobain Glass France. dated Sep. 12, 2018. 9 pages.
Notice of Allowance for U.S. Appl. No. 15/881,576, filed Jan. 26, 2018, on behalf of Saint-Gobain Glass France. dated Nov. 6, 2018. 9 pages.
Written Opinion for International Application No. PCT/EP2017/054735 filed Mar. 1, 2017 on behalf of Saint-Gobain Glass France. dated May 24, 2017. 12 pages. (English Translation + German Original).

* cited by examiner

| Providing a thermoplastic film having a constant thickness |
|---|

↓

| Stretching the film, thus creating the intermediate layer (3) according to the invention having the wedge angle alpha |
|---|

↓

| Arranging the intermediate layer (3) between an outer (1) and an inner pane (2) |
|---|

↓

| Laminating the outer pane (1), the intermediate layer (3), and the inner pane (2) to form a composite glass |
|---|

COMPOSITE GLASS HAVING REDUCED THICKNESS FOR A HEAD-UP DISPLAY (HUD)

CROSS REFERENCE TO RELATED APPLICATIONS

The present application is the U.S. national stage of International Patent Application PCT/EP2015/073625 filed internationally on Oct. 13, 2015, which, in turn, claims priority to European Patent Application No. 14 196 732.3 filed on Dec. 8, 2014.

The invention relates to a composite glass and a projection arrangement for a head-up display, a method for producing the composite glass, and use thereof.

Modern automobiles are increasingly equipped with so called head-up displays (HUDs). With a projector, for example, in the region of the dashboard or in the roof region, images are projected onto the windshield, reflected there, and perceived by the driver as a virtual image (from his point of view) behind the windshield. Thus, important data can be projected into the driver's field of vision, for example, the current driving speed, navigation or warning messages, which the driver can perceive without having to divert his glance from the road. Head-up displays can thus contribute significantly to an increase in traffic safety.

With the head-up displays described above, the problem arises that the projector image is reflected on both surfaces of the windshield. Thus, the driver perceives not only the desired primary image but also a slightly offset secondary image usually weaker in intensity. The latter is commonly referred to as a ghost image. This problem is commonly resolved in that the reflecting surfaces are arranged at a angle relative to one another deliberately selected such that the primary image and the ghost image coincide, as a result of which the ghost image is no longer distractingly noticeable. In prior art composite glasses for head-up displays, the wedge angle is, typically roughly 0.5 mrad.

Windshields comprise two glass panes that are laminated to one another via a thermoplastic film. If the surfaces of the glass panes are to be arranged, as described, at an angle, it is customary to use a thermoplastic film with a non-constant thickness. This is also referred to as a wedge-shaped film or a wedge film. The angle between the two surfaces of the film is referred to as a wedge angle. The wedge angle can be constant over the entire film (linear change in thickness) or can change depending on position (nonlinear change in thickness). Composite glasses with wedge films are known, for example, from WO2009/071135A1, EP1800855B1, or EP1880243A2.

Wedge films are typically produced by extrusion, wherein a wedge-shaped extrusion die is used. The production of a wedge film with a desired wedge angle, which depends, among other things, on the concrete pane geometry and the projection arrangement of the head up display, is very expensive and complex.

The object of the invention is to provide an improved composite glass for a head-up display that is more economical and simpler to produce than prior art composite glasses of this type.

The object of the present invention is accomplished according to the invention by a composite glass according to claim 1. Preferred embodiments emerge from the subclaims.

The composite glass according to the invention for a head-up display (HUD) has an upper edge and a lower edge. The term "upper edge" refers to that side edge of the composite glass that is intended to point upward in the installed position. "Lower edge" refers to that side edge that is intended to point upward in the installed position. If the composite glass is the windshield of a motor vehicle, the upper edge is frequently referred to as the "roof edge" and the lower edge as the "engine edge".

The composite glass (or composite pane) according to the invention comprises an outer pane and an inner pane that are bonded to one another via a thermoplastic intermediate layer. The composite glass is intended, in an opening, in particular a window opening of a motor vehicle, to separate the interior from the external environment. In the context of the invention, "inner pane" refers to the pane of the composite pane facing the interior (motor vehicle interior). "Outer pane" refers to the pane facing the external environment.

The inner pane has a thickness less than 1.2 mm. The thickness of the intermediate layer is variable, at least in sections, in the vertical course between the lower edge and the upper edge of the composite glass with a maximum wedge angle $\alpha$ less than or equal to 0.3 mrad. The wedge angle has, however, at least in sections, a finite wedge angle, in other words, a wedge angle greater than 0°. Here, the term "in sections" means that the vertical course between the lower edge and the upper edge has at least one section in which the thickness of the intermediate layer varies depending on position. The thickness can, however, also change in a plurality of sections or in the entire vertical course. The term "vertical course" refers to the course between the lower edge and the upper edge with the direction of the course being substantially perpendicular to said edges.

"Wedge angle" refers to the angle between the two surfaces of the intermediate layer. If the wedge angle is not constant, the tangents to its surfaces must be used for its measurement at a point.

The advantage of the invention resides in the combination of at least one thin pane (the inner pane) and the small wedge angle of the intermediate layer. Due to the use of at least one pane that is significantly thinner than typical panes for windshields (roughly 2.1 mm), the reflecting surfaces are closer together. As a result, the primary image and the ghost image are less greatly shifted relative to one another such that they can be made to coincide by means of a comparatively small wedge angle. The wedge angles less than or equal to 0.3 mrad according to the invention are significantly smaller than the wedge angles for prior art composite glasses in the range of 0.5 mrad. The use of thin panes thus enables the use of thermoplastic films with only small wedge angles, which are more economical and simpler to produce than films with larger wedge angles. In particular such films can be obtained by stretching a film of constant thickness instead of by extrusion.

Furthermore, the small wedge angles according to the invention reduce a frequently arising disadvantage of composite glasses for head-up displays. As a result of refraction and reflection on the different surfaces of the composite glass, double images—objects that are observed through the composite glass appear double—can arise in transmission. This effect can be reinforced by the wedge films optimized for HUD (with thicknesses typically increasing from bottom to top, optimized for prevention of ghost images in reflexion). The invention enables the use of very small wedge angles as a result of which the problem of double images in transmission is reduced.

Moreover, the at least one thin pane reduces the weight of the composite glass, which contributes to lower fuel consumption of the vehicle. The requirements for motor vehicle windows with regard to stability and fracture resistance, in particular scratch resistance and stone impact resistance, are still guaranteed, to which asymmetry of the outer pane and the inner pane with regard to their thickness also contributes.

The composite glass according to the invention is preferably a windshield of a vehicle, in particular a motor vehicle, for example, a passenger car.

The outer pane can, in principle, have a thickness in the conventional range for composite glasses, in particular in the range from 2.1 mm to 3.0 mm, for example, 2.1 mm or 2.6 mm. In a particularly advantageous embodiment, the outer pane is also a thinner pane and has a thickness less than 2.1 mm. By this means, the above-mentioned advantages of the composite glass according to invention are intensified.

The thickness of the outer pane is preferably from 1.2 mm to 2.0 mm, particularly preferably from 1.4 mm to 1.8 mm, most particularly preferably from 1.5 mm to 1.7 mm. The thickness of the inner pane is preferably from 0.3 mm to 1.1 mm, particularly preferably from 0.5 mm to 0.9 mm, most particularly preferably from 0.6 mm to 0.8 mm. With these thicknesses, good properties with regard to reflection behavior are obtained and ghost images can be effectively prevented with the small wedge angles according to the invention. At the same time, the composite glasses are sufficiently stable to be used as motor vehicle glazing. The asymmetric combination of a thicker outer pane and a thinner inner pane has proved itself for increasing stone impact resistance and fracture resistance.

The inner pane and the outer pane are preferably made of glass, particularly preferably soda lime glass, which has proved itself for window glasses. The panes can, however, also be made of other types of glass, for example, borosilicate glass or aluminosilicate glass. The panes can, in principle, also be manufactured from plastic, in particular polycarbonate or PMMA.

The maximum wedge angle $\alpha$ is preferably less than or equal to 0.2 mrad. In a most particularly advantageous embodiment, the maximum wedge angle $\alpha$ is less than or equal to 0.15 mrad, preferably less than or equal to 0.1 mrad. The smaller the wedge angle, the simpler it is to produce the intermediate layer by stretching, and the less pronounced the problem of double images in transmission. The term "the maximum wedge angle" refers to the largest wedge angle that occurs in the intermediate layer.

The greater the image distance of the HUD, i.e., the distance of the virtual image from the composite glass, the smaller the wedge angle has to be for prevention of the double image. Large image distances occur in particular with so-called "augmented reality" HUDs, in which not only one bit of information is projected onto a limited region of the windshield, but, rather, elements of the external environment are included in the display. Examples include tagging a pedestrian, indicating the distance from a vehicle ahead, or projecting navigation data directly on the road, for example, for flagging the lane to be selected. For typical image distances of an augmented reality HUD, wedge angles less than or equal to 0.15 mrad are sufficient.

The wedge angle can be constant in the vertical course, which results in a linear change in thickness of the intermediate layer, with the thickness typically becoming larger from the bottom to the top. The direction indication "from the bottom to the top" refers to the direction from the lower edge to the upper edge, i.e., the vertical course. However, more complex thickness profiles can be present, in which the wedge angle is linearly or non-linearly variable from the bottom to the top (in other words, position dependent in the vertical course).

Preferably, the thickness of the intermediate layer increases, at least in sections, from the bottom to the top in the vertical course.

The variable thickness of the intermediate layer can be restricted to one section of the vertical course. This section preferably corresponds at least to the so-called "HUD region" of the composite glass, i.e., to the region in which the HUD projector produces an image. The section can, however, also be larger. The thickness of the intermediate layer can be variable over the entire vertical course, for example, increase substantially steadily from the lower edge to the upper edge.

The thickness of the intermediate layer can be constant in horizontal sections (in other words, sections roughly parallel to the upper edge and lower edge). In that case, the thickness profile is constant over the width of the composite glass. The thickness can, however, also be variable in horizontal sections. In that case, the thickness is variable not only in the vertical course but also in the horizontal course.

The intermediate layer is formed by at least one thermoplastic film. In an advantageous embodiment, the wedge angle is produced in the film by stretching. The wedge-shaped film is not extruded, but is originally provided as conventional film with substantially constant thickness and reshaped by stretching such that it has the desired wedge angle. This is simpler and more economical than production by extrusion. The person skilled in the art subsequently recognizes whether a wedge angle is formed by stretching or by extrusion, in particular from the typical course of thickness in the vicinity of the lower edge and/or the upper edge.

The intermediate layer preferably has a minimum thickness from 0.5 mm to 1 mm, particularly preferably from 0.6 mm to 0.9 mm. "Minimum thickness" refers to the thickness at the thinnest point of the intermediate layer. Composite glasses with thinner intermediate layers frequently have excessively low stability to be able to be used as motor vehicle panes. Thermoplastic films, in particular PVB films are sold in the standard thickness 0.76 mm. Wedge angles according to the invention can be introduced advantageously from these films by stretching. Since the wedge angles according to the invention are very small, the film is not thinned so greatly that problems with the stability of the composite glass arise.

The intermediate layer preferably contains at least polyvinyl butyral (PVB), ethylene vinyl acetate (EVA), polyurethane (PU), or mixtures or copolymers or derivatives thereof, particularly preferably PVB. In a preferred embodiment, the intermediate layer is formed from a PVB film.

The intermediate layer can be implemented by a single film or by more than one film. In the latter case, at least one of the films must be implemented with the wedge angle. The intermediate layer can also be implemented as a so-called "acoustic film", which has a noise suppression effect. Such films typically consist of at least three layers, with the middle layer having higher plasticity or elasticity than the layers surrounding it, for example, as a result of a higher plasticizer content.

In one embodiment of the invention, the outer pane and/or the inner pane is a chemically prestressed pane, preferably the thinner inner pane, which is exposed to lower stone impact stresses. In chemical prestressing, the chemical composition of the glass in the region of the surface is altered by ion exchange. In a particularly preferred embodiment, the outer pane and the inner pane are non-prestressed panes. In another particularly preferred embodiment, the outer pane is a non-prestressed pane and the inner pane a chemically prestressed pane.

The outer pane, the inner pane, and the thermoplastic intermediate layer can be clear and colorless, but also tinted or colored. In a preferred embodiment, the total transmittance through the composite glass is greater than 70%, in particular when the composite glass is a windshield. The term "total transmittance" is based on the process for testing the light permeability of motor vehicle windows specified by ECE-R 43, Annex 3, § 9.1.

The composite glass is preferably bent in one or a plurality of spatial directions, as is customary for motor vehicle panes, with typical radii of curvature in the range from roughly 10 cm to roughly 40 m. The composite glass can, however, also be flat, for example, when it is provided as a pane for buses, trains, or tractors.

The composite glass according to the invention can have a functional coating, for example, an IR reflecting or absorbing coating, a UV reflecting or absorbing coating, a chromophoric coating, a low emissivity coating, a heatable coating, a coating with an antenna function, an anti-splinter coating, or an electromagnetic radiation shielding coating. The functional coating is preferably arranged on the outer pane. The thicker outer pane is technically simpler and more economical to coat, for example, by physical vapor deposition (such as sputtering) than the thinner inner pane. The functional coating is preferably arranged on the surface of the outer pane facing the thermoplastic intermediate layer, where it is protected against corrosion and damage. The functional coating can also be arranged on an insertion film in the intermediate layer, for example, made of polyethylene terephthalate (PET).

The composite glass can also be provided with an additional function, in that the intermediate layer has, additionally or alternatively to the functional coating, functional inclusions, for example, inclusions with IR absorbing, UV absorbing, chromophoric, or acoustic properties. The inclusions are, for example, organic or inorganic ions, compounds, aggregates, molecules, crystals, pigments, or dyes.

The invention further includes a projection arrangement for a head-up display, at least comprising a composite glass according to the invention and a projector, which is aimed at a region of the composite glass aimed at, with the thickness of the intermediate layer being variable in the vertical course at least in this region.

The region at which the projector is aimed is the region in which an image can be produced by the projector. This region is referred to as the HUD region of the composite glass. The thickness of the intermediate layer is variable preferably at least in the HUD region, in particular at least in the entire HUD region, in order to effectively prevent ghost images. The section with variable thickness can, however, even be larger than the HUD region.

The invention is further accomplished by a method for producing a composite glass for a head-up display with an upper edge and a lower edge, wherein (a) a thermoplastic intermediate layer is provided, whose thickness in the course between two opposing edges (namely those that are provided as the lower edge and the upper edge) is variable at least in sections with a maximum wedge angle α less than or equal to 0.3 mrad;

(b) the intermediate layer is arranged between an outer pane made of glass and an inner pane made of glass with a thickness less than 1.2 mm, wherein said edges (between which the thickness is variable) are oriented facing the upper edge and lower edge; and (c) the inner pane and the outer pane are bonded to one another by lamination.

The preferred embodiments described above with reference to the composite glass apply mutatis mutandis to the method according to the invention.

The thermoplastic intermediate layer is provided as a film. In a preferred embodiment, this is a conventional thermoplastic film, in particular PVB film, having (in the initial state) substantially constant thickness. The variable thickness with the wedge angle according to the invention is introduced by stretching the film, in other words, the action of mechanical force through appropriate pulling. The small wedge angles according to the invention can be obtained by stretching, which is significantly more economical than production of the wedge film by extrusion. Alternatively, the thermoplastic intermediate layer can also be produced by extrusion using a wedge-shaped extrusion die.

If the composite glass is to be bent, the outer pane and the inner pane are preferably subjected to a bending process before lamination. Preferably, the outer pane and the inner pane are bent congruently together (i.e., at the same time and by the same tool), since, thus, the shape of the panes for the subsequently occurring lamination is optimally matched. Typical temperatures for glass bending processes are, for example, 500° C. to 700° C.

In a preferred embodiment, the inner pane and/or the outer pane is provided with chemical prestressing. After bending, the pane is advantageously cooled slowly, preferably all the way to cooling to a temperature of 400° C. with a cooling rate of 0.05° C./sec to 0.5° C./sec, to prevent thermal stresses. It can be further cooled thereafter, even with higher cooling rates since below 400° C. the risk of generating thermal stresses is low. The chemical prestressing is preferably done at a temperature from 300° C. to 600° C., particularly preferably from 400° C. to 500° C. The pane is treated with a salt melt, for example, immersed in the salt melt. During the treatment, in particular sodium ions of the glass are replaced by larger ions, in particular larger alkali ions, creating the desired surface compressive stresses. The salt melt is preferably the melt of a potassium salt, particularly preferably potassium nitrate ($KNO_3$) or potassium sulfate ($KSO_4$), most particularly preferably potassium nitrate ($KNO_3$). Usual duration times are from 2 hours to 48 hours. After the treatment with the salt melt, the pane is cooled to room temperature. Then, the pane is cleaned, preferably with sulfuric acid ($H_2SO_4$).

The production of the composite glass by lamination is done with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

The invention further includes the use of a composite glass according to the invention in a motor vehicle, preferably a passenger car, as a windshield, which serves as a projection surface of a head-up display.

In the following, the invention is explained in detail with reference to drawings and exemplary embodiments. The drawings are schematic representations and are not true to scale. The drawings in no way restrict the invention.

Figure 2:
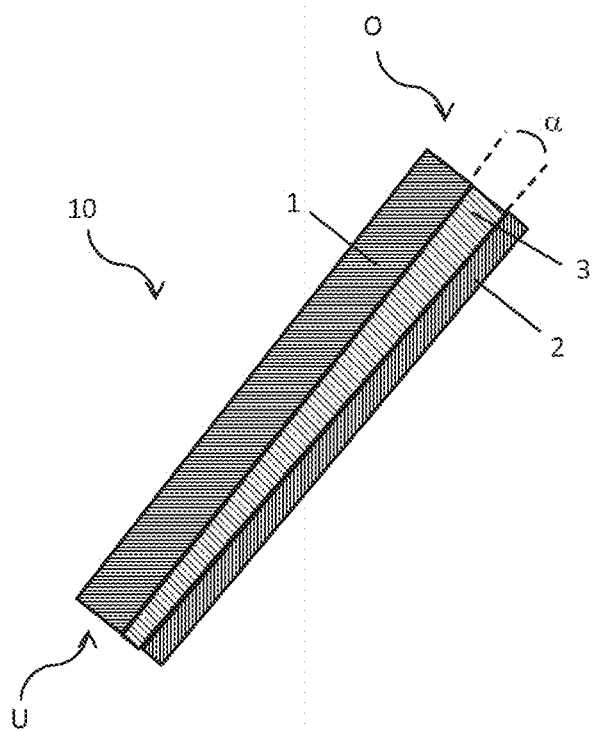
Figures 3, 4:
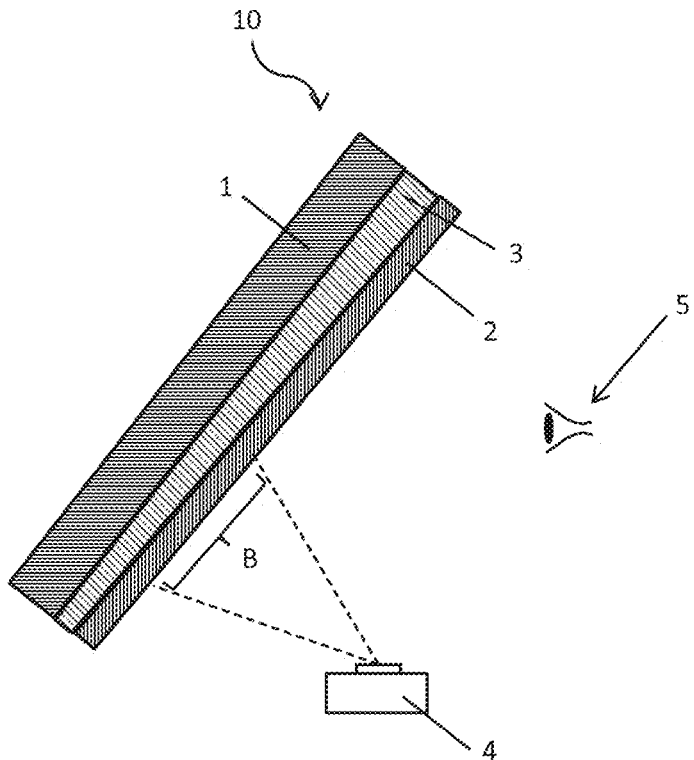

They depict:

FIG. 1 a plan view of an embodiment of the composite glass according to the invention, FIG. 2 a cross-section through the composite glass of FIG. 1, FIG. 3 the composite glass of FIG. 2 as a component of a projection arrangement according to the invention, and FIG. 4 a flowchart of an embodiment of the method according to the invention.

FIG. 1 and FIG. 2 depict in each case a detail of a composite glass 10 according to the invention, which comprises an outer pane 1 and an inner pane 2 that are bonded to one another via a thermoplastic intermediate layer 3. The composite glass is provided as a windshield of a motor vehicle that is equipped with a head-up display. In the installed position, the outer pane 1 is turned toward the external environment; the inner pane 2, toward the vehicle interior. The upper edge O of the composite glass points, in the installed position, upward toward the vehicle roof (roof edge); the lower edge U, downward toward the engine compartment (engine edge).

The outer pane 1 is made of soda lime glass with a thickness of 1.6 mm. The inner pane 2 is likewise made of soda lime glass and has a thickness of only 0.7 mm. The outer pane 1 and in particular the inner pane 2 are thus significantly thinner than the panes of prior art composite glasses, which are typically in the range from 1.8 mm to 2.6 mm, in the case of windshields, customarily, 2.1 mm.

The thickness of the intermediate layer 3 increases steadily in the vertical course from the lower edge U to the upper edge O. For the sake of clarity, the thickness increase is depicted linearly in the figure, but can also have more complex profiles. The intermediate layer 3 is implemented as a single film made of PVB. In the initial state, the film was a PVB film with the standard thickness 0.76 mm. The thickness increase was introduced into the film by stretching, i.e., pulling on the lower edge U. The wedge angle α is roughly 0.1 mrad. Wedge angles of prior art compound glasses for HUDs are in the range around 0.5 mrad.

In the figure, a region B, which corresponds to the HUD region of the composite glass, is also indicated. In this region, images are to be produced by an HUD projector. By means of the wedge-shaped configuration of the intermediate layer, the two images that are produced by reflection of the projector image on the two surfaces of the outer pane 1 and of the inner pane 2 facing away from the intermediate layer 3 coincide with one another. Consequently, distracting ghost images arise to a small extent.

The low thicknesses of the outer pane 1 and the inner pane 2 result in the fact that very small wedge angles α, which can be generated without any problems by stretching, are necessary. This is significantly simpler and more economical than production of the wedge film by extrusion. Furthermore, large wedge angles frequently result in pronounced double images in transmission, which can also be avoided here.

FIG. 3 depicts the composite glass 10 of FIGS. 1 and 2 as part of a projection arrangement for an HUD. The arrangement comprises, besides the composite glass 10, a projector 4, which is aimed at a region B. In the region B (HUD region), images can be produced by the projector that are perceived by the observer 5 (motor vehicle driver) as virtual images on the side of the composite glass 10 turned away from him. The wedge angle in the region B results in surfaces of the outer pane 1 and of the inner pane 2 inclined relative to one another, by which means ghost images can be prevented.

FIG. 4 depicts a flowchart of an exemplary embodiment of the method according to the invention for producing a composite glass 10 according to the invention.

LIST OF REFERENCE CHARACTERS

(10) composite glass
(1) outer pane
(2) inner pane
(3) thermoplastic intermediate layer
(4) projector
(5) viewer/motor vehicle driver
(O) upper edge
(U) lower edge
(B) region of the composite glass/HUD region
α wedge angle
A-A' section line

The invention claimed is:

1. A composite glass for a head-up display comprising:
an upper edge,
a lower edge,
an outer pane made of glass, and
an inner pane made of glass,
wherein
the outer pane and the inner pane are bonded to one another via a thermoplastic intermediate layer, wherein the intermediate layer consists of a single film,
the inner pane has a thickness less than 1.2 mm, and
a thickness of the intermediate layer in the vertical course between the lower edge and the upper edge is variable at least in one or more sections, having a maximum wedge angle less than or equal to 0.3 mrad.

2. The composite glass according to claim 1, wherein the composite glass is a motor vehicle windshield.

3. The composite glass according to claim 1, wherein the outer pane has a thickness less than 2.1 mm.

4. The composite glass according to claim 3, wherein the thickness of the outer pane is from 1.2 to 2.0 mm.

5. The composite glass according to claim 4, wherein the thickness of the outer pane is from 1.4 to 1.8 mm.

6. The composite glass according to claim 1, wherein the thickness of the inner pane is from 0.3 to 1.1 mm.

7. The composite glass according to claim 6, wherein the thickness of the inner pane is from 0.5 to 0.9 mm.

8. The composite glass according to claim 7, wherein the thickness of the inner pane is from 0.6 to 0.8 mm.

9. The composite glass according to claim 1, wherein the wedge angle is less than or equal to 0.2 mrad.

10. The composite glass according to claim 9, wherein the wedge angle is less than or equal to 0.15 mrad.

11. The composite glass according to claim 10, wherein the wedge angle is less than or equal to 0.1 mrad.

12. The composite glass according to claim 1, wherein the intermediate layer is implemented by one thermoplastic film, and wherein the wedge angle is created by stretching.

13. The composite glass according to claim 1, wherein the intermediate layer has a minimum thickness from 0.5 mm to 1 mm.

14. The composite glass according to claim 13, wherein the intermediate layer has a minimum thickness from 0.6 mm to 0.9 mm.

15. The composite glass according to claim 1, wherein the intermediate layer comprises at least one component selected from the group consisting of: i) polyvinyl butyral (PVB), ii) ethylene vinyl acetate (EVA), and iii) polyurethane (PU),
or mixtures or copolymers or derivatives thereof.

16. The composite glass according to claim 1, wherein the outer pane and/or the inner pane is a chemically prestressed pane.

17. A projection arrangement for a head-up display comprising:
the composite glass according to claim 1 and further comprising a projector, wherein
the projector is aimed at a region of the composite glass, and
a thickness of the intermediate layer is variable at least in said region.

18. A method comprising:
using the composite glass according to claim 1 as a windshield in a motor vehicle, wherein the composite glass is a projection surface of a head-up display.

19. A composite glass for a head-up display, comprising:
an upper edge,
a lower edge,
an outer pane made of glass, and
an inner pane made of glass,
wherein
the outer pane and the inner pane are bonded to one another via a thermoplastic intermediate layer,
the inner pane has a thickness from 0.5 mm to 0.9 mm, and
a thickness of the intermediate layer in the vertical course between the lower edge and the upper edge is variable at least in one or more sections, having a maximum wedge angle less than or equal to 0.2 mrad.

20. The composite glass according to claim 19, wherein the composite glass is a motor vehicle windshield.

21. The composite glass according to claim 19, wherein the outer pane has a thickness less than 2.1 mm.

22. The composite glass according to claim 21, wherein the thickness of the outer pane is from 1.2 to 2.0 mm.

23. The composite glass according to claim 19, wherein the wedge angle is less than or equal to 0.15 mrad.

24. The composite glass according to claim 19, wherein the wedge angle is less than or equal to 0.1 mrad.

25. The composite glass according to claim 19, wherein the intermediate layer has a minimum thickness from 0.5 mm to 1 mm.

26. A method for producing a composite glass for a head-up display comprising an upper edge and a lower edge, the method comprising the steps of:
(a) providing a thermoplastic intermediate layer, having variable thickness in a course between two opposing edges at least in one or more sections having a maximum wedge angle less than or equal to 0.3 mrad, wherein the intermediate layer consists of a single film;
(b) arranging the intermediate layer between an outer pane made of glass and an inner pane made of glass having a thickness of less than 1.2 mm, wherein said edges are oriented toward the upper edge and the lower edge; and
(c) bonding the inner pane and the outer pane to one another by lamination.

27. The method according to claim 26, wherein the wedge angle is introduced into a thermoplastic film of constant thickness by stretching.

* * * * *